United States Patent
Collado Briceño et al.

(10) Patent No.: US 8,297,891 B2
(45) Date of Patent: Oct. 30, 2012

(54) DRILL-AND-HOLE DETECTOR TOOL, METHOD OF UTILIZATION THEREOF AND USES

(75) Inventors: Enrique Collado Briceño, Getafe Madrid (ES); Angel José Delgado Nuñez, Getafe Madrid (ES)

(73) Assignee: Airbus Operations, SL, Getafe (Madrid) (ES)

( * ) Notice: Subject to any disclaimer, the term of this patent is extended or adjusted under 35 U.S.C. 154(b) by 1114 days.

(21) Appl. No.: 12/222,564

(22) Filed: Aug. 12, 2008

(65) Prior Publication Data
US 2009/0220314 A1    Sep. 3, 2009

(30) Foreign Application Priority Data

Feb. 28, 2008   (ES) .................................. 200800575

(51) Int. Cl.
*B23B 49/02* (2006.01)
(52) U.S. Cl. ................... 408/115 R; 408/72 B
(58) Field of Classification Search ............... 408/1 R, 408/72 R, 72 B, 79–80, 87, 95, 97, 115 R, 408/115 B, 241 G; *B23B 49/02*
See application file for complete search history.

(56) References Cited

U.S. PATENT DOCUMENTS

| | | | |
|---|---|---|---|
| 1,445,016 A * | 2/1923 | Golembiewski | 269/289 R |
| 2,348,116 A | 5/1944 | Dzus | |
| 2,383,953 A | 9/1945 | Beard | |
| 2,430,025 A | 11/1947 | Mattias et al. | |
| 2,466,023 A | 4/1949 | Griffin | |
| 2,848,813 A | 8/1958 | Kienle | |
| 3,302,674 A * | 2/1967 | Russell et al. | 408/241 G |
| 4,194,861 A * | 3/1980 | Keller | 408/109 |
| 4,521,140 A * | 6/1985 | Doescher et al. | 408/97 |
| 4,601,618 A | 7/1986 | McEldowney | |
| 4,678,378 A * | 7/1987 | Koczarski | 408/46 |
| 4,813,826 A * | 3/1989 | Riedel | 408/108 |
| 4,897,000 A * | 1/1990 | Suzuki | 408/79 |
| 5,114,285 A * | 5/1992 | Brydon | 408/115 R |
| 5,888,032 A * | 3/1999 | Jensen | 408/1 R |
| 7,226,253 B2 * | 6/2007 | Otten | 408/67 |
| 7,258,512 B2 * | 8/2007 | Morrison et al. | 408/1 R |
| 2006/0013662 A1 | 1/2006 | Faul et al. | |
| 2006/0104730 A1 * | 5/2006 | Valdez | 408/3 |

FOREIGN PATENT DOCUMENTS

| | | |
|---|---|---|
| GB | 134286 | 10/1919 |
| GB | 593221 A * | 10/1947 |
| GB | 660412 | 11/1951 |
| GB | 2024674 A * | 1/1980 |

* cited by examiner

*Primary Examiner* — Daniel Howell
(74) *Attorney, Agent, or Firm* — Wenderoth, Lind & Ponack, LLP.

(57) ABSTRACT

The invention relates to a drill-and-hole detector tool consisting of at least two plates (1*a* and 1*b*) having the first plate (1*a*) at least three passing holes (2*b*) at one end, and a chimney (3) used as a drilling guide at the other end and having the second plate (1*b*) at least three pins (2*a*) at one end and a positioning rivet or stub (4) at the other end, in such a way that when the two plates (1*a* and 1*b*) are superimposed, the three passing holes (2*b*) of the first plate (1*a*) coincide with the three pins (2*a*) of the second plate (1*b*), and the chimney (3) of the first plate (1*a*) coincides with the positioning rivet or stub (4) of the second plate (1*b*).

5 Claims, 3 Drawing Sheets

DRILL-AND-HOLE DETECTOR TOOL, METHOD OF UTILIZATION THEREOF AND USES

OBJECT OF THE INVENTION

As stated in the title of this specification, the present invention relates to a drill-and-hole detector tool, capable of transferring or copying the drill holes of an original support structure of a piece to another piece, when it is required to assemble a piece that comes without any prior drill holes. The invention can also relate to drill holes for which it is not possible to have access from both sides, either because one of the sides is inaccessible or because it is too far away or because in order to get to it laborious operations have to be carried out involving for example removing other pieces of the structure close to the piece it is desirable to assemble.

In addition, the present invention has the aim of providing a method of utilization of the drill-and-hole detector tool described.

TECHNICAL FIELD OF THE INVENTION

The present invention has application in any sector of industry in which it is required to assemble pieces that are coupled by means of drill holes and, as a consequence, a prior task of copying the drill holes from one piece to another has to be performed, either because it is desirable to copy drill holes that are inaccessible from one side or because it is desirable to copy blind drill holes.

In other words, the present invention has application in any assembly chain where the assembly has to be carried out by means that require drill holes, such as rivets, bolts or screws.

So, for example, it has application in heavy industry, in the automobile industry, in the railway industry, in the aeronautical industry and the like.

In particular, the present invention was conceived for the aeronautical industry, more precisely for the substitution, replacement or reinforcement of a piece that requires drill holes.

STATE OF THE ART PRIOR TO THE INVENTION

In any sector of industry where it is required to assemble pieces that are coupled by means of drill holes, it is necessary to perform a prior task of copying the drill holes from one piece to another, either in order to copy drill holes that are inaccessible from one of their sides or in order to copy blind drill holes.

Currently, no device or tool is known that would facilitate this prior task, and a tedious task of measurement is carried out involving innumerable measurement operations, hole by hole, of the coupled piece to the piece to be coupled. Alternatively, non-deformable plastic templates are used, where the drill holes are copied, for which it is necessary to carry out a prior measurement. The plastic template is then positioned on the piece to be coupled and, after making a new measurement, the drill holes are copied onto that piece. This entails innumerable errors in the two operations of copying and positioning of the plastic template.

Moreover, in the case of blind or inaccessible drill holes it is sometimes necessary to carry out the complete removal of the structure where it is desirable to couple a piece in order to facilitate the measurement. These measurement systems furthermore entail a very high degree of human error factor, present in any measurement. So, these traditional methods increase the possibility of creating a wrong drill hole, which implies an increase in the time taken to position a piece and an increase in the number of original pieces necessary for carrying out an assembly, given that a piece with a wrong drill hole is usually discarded.

Another method, existing in the current art, consists of transferring the positions from one piece to another by means of measurements made with respect to a fixed reference. But this method presents serious difficulties, such as for example given that the surfaces are not always flat, measuring on this type of surface is always a difficult exercise subject to a large number of errors.

It was therefore desirable to obtain a simple tool that facilitates this task and makes it more precise, in other words, one tool that would overcome the following drawbacks:
  copying drill holes to a piece, avoiding the possibility of providing an erroneous hole;
  copying drill holes that are inaccessible via one of their sides and blind drill holes, avoiding laborious tasks of operations involving removal of other parts of the structure;
with the advantages that the tool is:
  easy to handle;
  economical in terms of the assembly time of the pieces and in terms of the manufacturing costs of the tool;
and further, the tool minimizes the human error factor.

DESCRIPTION OF THE INVENTION

The present invention relates to a tool that overcomes the drawbacks of the methods of transfer/copying of drill holes existing in the current art. To achieve this, the tool described in this present invention proposes to use the same drill holes on which the original piece was installed, in order thereby to avoid moving or changing more pieces than strictly necessary.

The present invention also has application for the copying of drill holes necessary for substituting, replacing or reinforcing any set of pieces that are not interchangeable and which require coupling by means involving drill holes, such as screws, bolts, rivets, etc.

So, the present invention describes a drill-and-hole detector tool comprising at least two plates. The first plate possesses at least three passing holes at one end and a chimney, which is used as a drilling guide at the other end. The second plate possesses at least three studs at one end and a positioning rivet or stub at the other end. All in such a way that when the two plates are superimposed, the three passing holes of the first plate coincide with the three studs of the second plate, and the chimney of the first plate coincides with the positioning rivet or stub of the second plate.

The first plate further comprises an additional hole, which can be located in the middle of the three passing holes. The additional hole is used, once the two plates have been mounted with the piece to copy, in order for a screw or similar element to pass through that additional hole and act as a stopper for the second plate, thereby preventing the first plate from rising up due to the lever effect at the end opposite to where the drilling chimney is located when pressure is exerted on the new piece to drill.

In addition, the drilling chimney and the positioning stub or rivet are easily changeable in order to allow choosing the most suitable ones according to the diameter of the hole to copy.

Furthermore, on account of the way in which the tool is constructed, it can be designed either to have a fixed thickness between the two plates, or with the possibility of varying that thickness between both plates in order to provide the tool with greater versatility.

Consequently, the most notorious advantages of the described tool are:

that it is a very simple device in its conception and therefore it is easy and economical to construct;

that it succeeds in safeguarding the existing structure due to avoiding unnecessary removal of other parts of the structure;

it avoids additional repairs than that of assembly of the required piece;

the cost of the piece to assemble is reduced, given the fact that the tool allows purchasing these pieces without any prior drill holes, in other words, the pieces are not required to be interchangeable;

measurements can be successfully made on surfaces that are not flat and in surfaces with low accessibility.

Moreover, the tool can be easily designed and manufactured in the actual workshop that requires to use it and it can be manufactured from any basic and sufficiently rigid material that may be found in a workshop, such as for example metal plate, rivets, a drilling chimney.

An additional advantage of the present invention consists of the possibility of the tool of being constructed adapting it to the shape and dimensions required in each case.

In addition, the present invention describes a method of utilization of the drill-and-hole detector tool described above, comprising:

choosing a positioning rivet or stub of a diameter equal to that of the hole to copy, in order to guarantee maximum precision in the copying, positioning the second plate in such a way that the positioning rivet or stub is located on (over) the hole to copy, locating a new piece to drill, on that second plate, locating the first plate of the drill-and-hole detector tool on the new piece to drill, fitting it exactly via its passing holes in the studs of the second plate, already positioned, causing the screw to pass through and thread it into the additional hole, in order thereby to leave a defined thickness between the plates at the opposite end to that where the piece to drill is to be found, fitting a drill bit into the chimney of the first plate and drilling to the required diameter.

To conclude, the present invention describes some of the most specific uses of the drill-and-hole detector tool, such as might be:

a) use for the interchange of the actuator fitting of the ramp for the main landing gear of an aircraft, given that on account of its structure and ease and economy of construction, it is feasible to construct it in various different shapes, in other words the tool can be adapted to the geometry of the surrounding structure; and b) use for an in situ repair, in other words, one made outside of the manufacturer's workshop, on the fuselage of an aircraft.

Sometimes, particularly, on landings and take-offs, impacts from stones or other heavy objects can occur to the fuselage of an aircraft, and these impacts can cause damages that need to be repaired before the plane is used again. For this type of repair, the tool described in the present patent is very useful, due to its ease and economy of construction, it can be constructed in situ, for example, in order to locate a plate for reinforcement on top of the damaged zone. This reinforcement plate requires prior drilling for being located and the solution provided by the drill-and-hole detector tool described here is very economical in terms of time, money and reliability.

BRIEF DESCRIPTION OF THE FIGURES

The present invention will be entirely understood on the basis of the brief description given below and the accompanying drawings that are presented, solely by way of example and which are therefore not restrictive within the present invention and in which.

Figure 1:
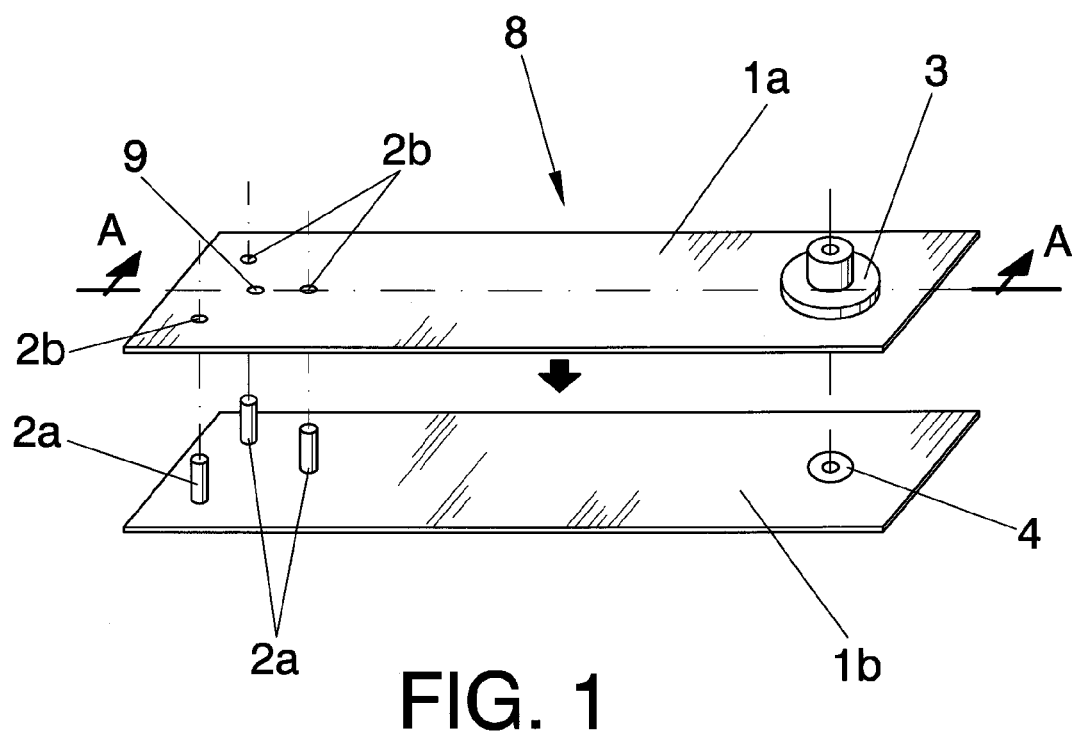
FIG. 1 shows a perspective view of the assembly of the drill-and-hole detector tool described in the present invention.

REFERENCES 1a and 1b: plates
2a: studs
2b: passing holes
3: chimney
4: positioning rivet or stub
5: new piece to drill
6: hole to copy
7: bit drill
8: drill-and-hole detector tool
9: additional hole
10: screw
d: thickness between the plates

FORM OF EMBODIMENT OF THE INVENTION

Figure 2:
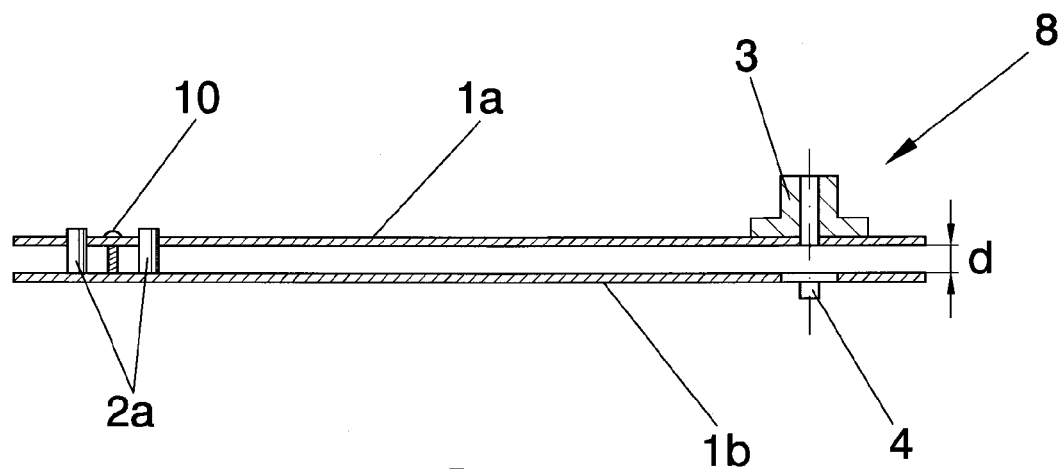
FIG. 2 shows a transverse cut along section A-A of FIG. 1, FIGS. 3a, 3b and 3c show a diagram of the method of utilization of the tool described in the present invention.
Figure 3A:
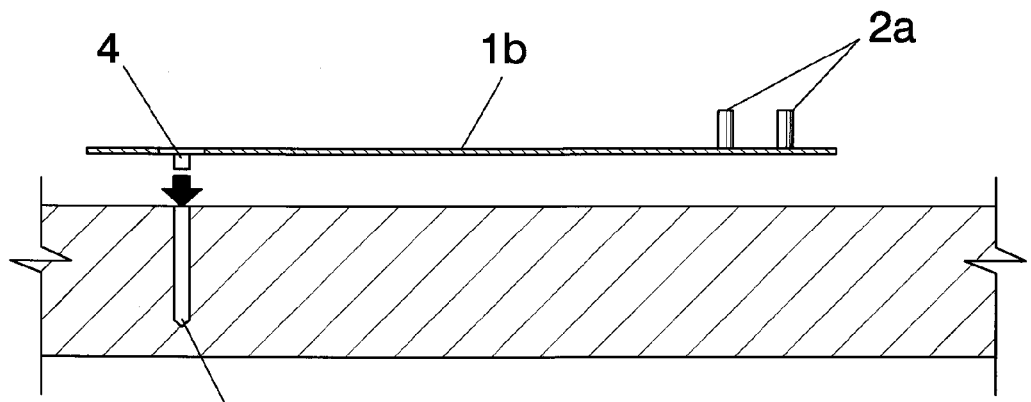
Figure 3B:
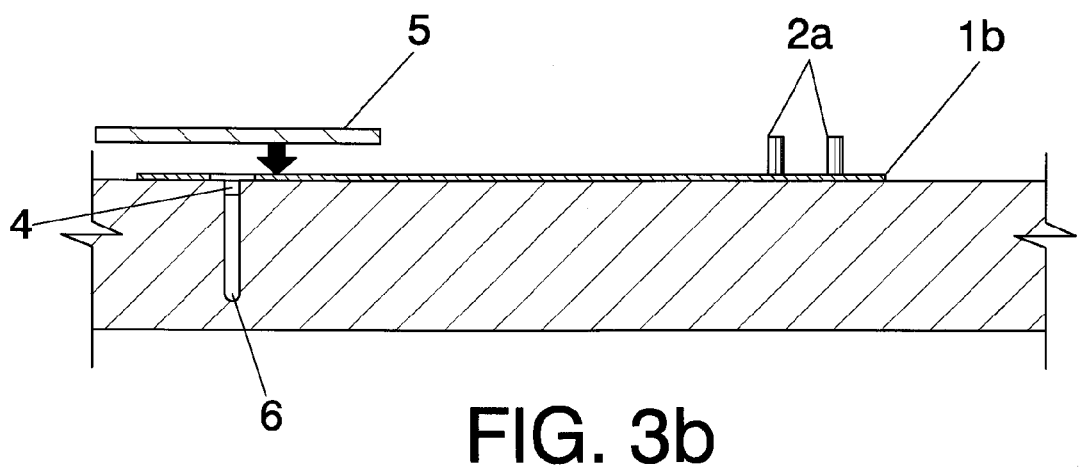
Figure 3C:
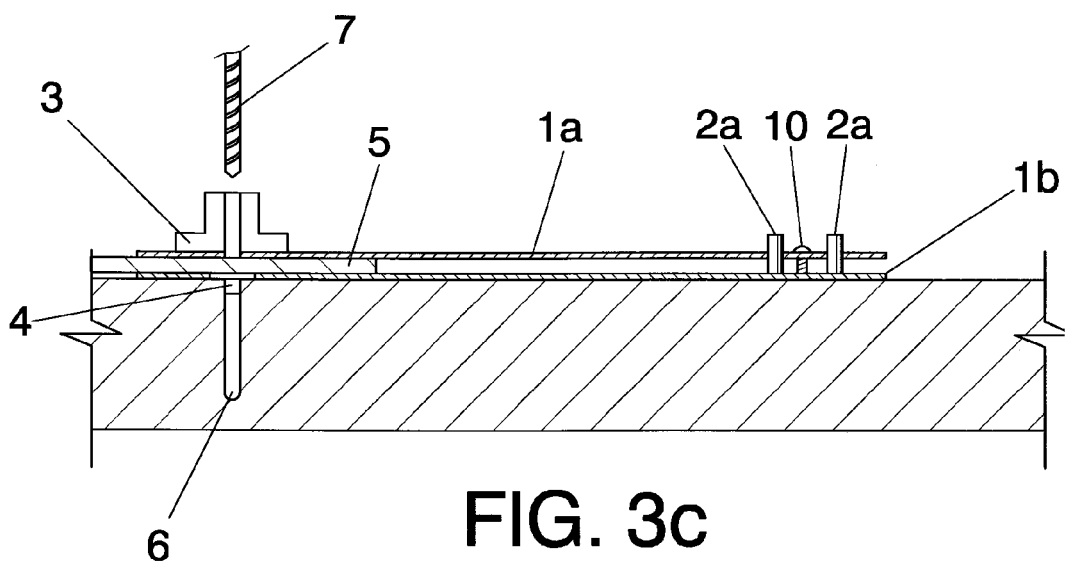
Figure 4:
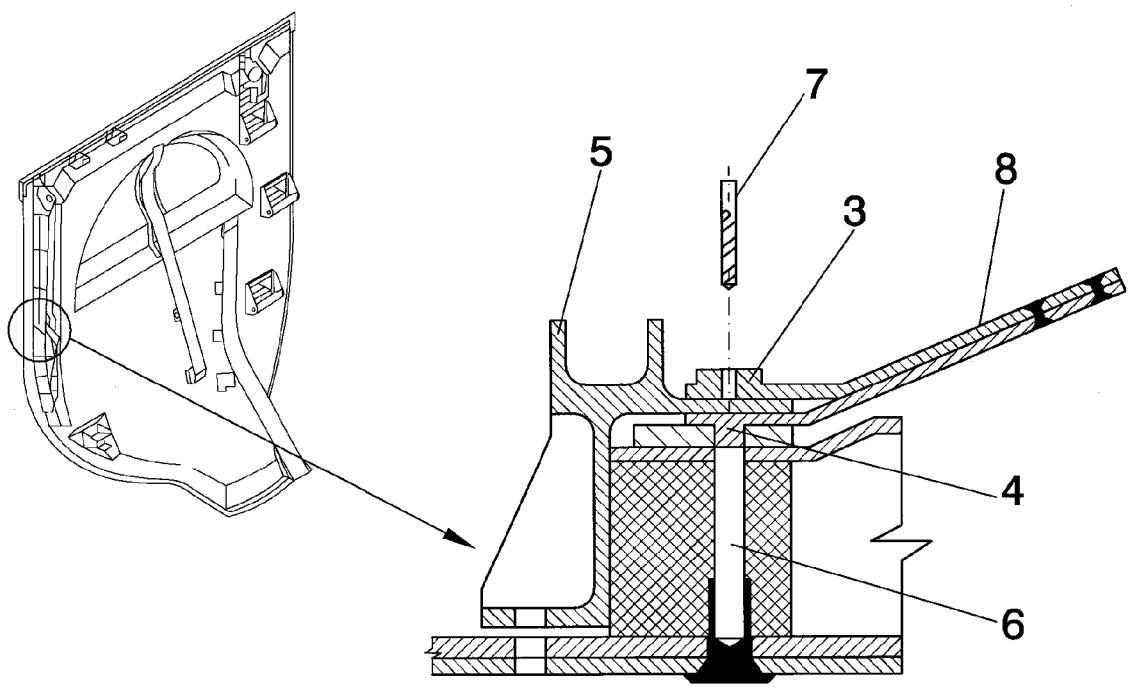
FIG. 4 shows a diagram of a particular embodiment described by way of example in the present invention

With the aim of reaching a better understanding of the object and functionality of this patent, and without being understood as restrictive solutions, so FIG. 1 shows a perspective view of the drill-and-hole detector tool (8) which preferably comprises two plates (1a and 1b) manufactured in any sufficiently rigid material, where the first plate (1a) possesses at least three stud holes (2b) at one end and a chimney (3) which is used as a drill guide at the other end, and the other plate (1b) possesses at least three studs (2a) at one end and a positioning rivet or stub (4) at the other end, in such a way that when the two plates (1a and 1b) are superimposed, the three stud holes (2b) of the first plate (1a) coincide with the three studs (2a) of the second plate (1b), and the chimney (3) of the first plate (1a) coincides with the positioning rivet or stub (4) of the second plate (1b), as illustrated in FIG. 2.

The first plate (1a) further comprises at least one additional hole (9), preferably located in the middle of the three stud holes (2b), being said additional hole threaded. The hole (9) is used so that, once the two plates (1a and 1b) have been mounted with the new piece to drill (5), a screw (10) is preferably made to pass through that additional hole (9), said screw acting as a stopper with the second plate (1b), thereby preventing the first plate (1a) from rising up due to the lever effect at the end opposite to where the drilling chimney (3) is located when pressure is exerted on the new piece to drill (5), in other words, defining the thickness (d).

It is important to emphasize that the chimney (3) and the positioning rivet or stub (4) can be interchangeable according to the diameter of the hole it is desirable to copy (6) and, moreover, the thickness (d) between the two plates can be variable or fixed, as required.

In a particular embodiment, when the drill-and-hole detector tool (8) is used for the interchange of the actuator fitting of the ramp for the main landing gear of an aircraft, such as for example the Airbus A320, the tool (8) can have a spoon-shape so that it can be adapted to the geometry of the surrounding structure and permit the work to be carried out comfortably and accurately.

Moreover, the present invention describes a method of utilization of the drill-and-hole detector tool (8) consisting of:

choosing a positioning rivet or stub (4) of a diameter equal to that of a hole to copy (6), in order to guarantee maximum precision in the copying, positioning the second plate (1b) in such a way that the positioning rivet or stub (4) is located on the hole to copy (6), locating a new piece to drill (5), on the second plate (1b), locating the first plate (1a) of the drill-and-hole detector tool (8) on the new piece to drill (5), fitting it exactly via its stud holes (2b) in the studs (2a) of the second plate (1b), already positioned, causing the screw (10) to pass through and thread into the additional hole (9), in order thereby to leave a defined thickness (d) between the plates (1a and 1b) at the opposite end to that where the piece to drill (5) is to be found, and fitting a bit of a drill (7) into the chimney (3) and drilling to the required diameter.

The invention claimed is:

1. A drill-and-hole detector tool comprising at least two plates (1a and 1b) wherein the first plate (1a) possesses at least three passing holes (2b) at one end and a chimney (3) which is used as a drill guide at the other end, and the second plate (1b) possesses at least three studs (2a) at one end and a positioning rivet or stub (4) at the other end, in such a way that when the two plates (1a and 1b) are superimposed, the three passing holes (2b) of the first plate (1a) coincide with the three studs (2a) of the second plate (1b), and the chimney (3) of the first plate (1a) coincides with the positioning rivet or stub (4) of the second plate (1b), wherein the first plate (1a) further comprise at least one additional hole (9) and a screw (10), said hole (9) being located in the middle of the three passing holes (2b) and threaded.

2. The drill-and-hole detector tool according to claim 1, wherein the chimney (3) and the positioning rivet or stub (4) are interchangeable according to a diameter of a hole to copy (6).

3. A method of utilization of the drill-and-hole detector tool according to claim 1, comprising:

choosing the positioning rivet or stub (4) of a diameter equal to that of a hole to copy (6), positioning the second plate (1b) in such a way that the positioning rivet or stub (4) is located on the hole to copy (6), locating a new piece to drill (5), on the second plate (1b), locating the first plate (1a) of the drill-and-hole detector tool (8) on the new piece to drill (5), fitting the first plate (1a) exactly via the passing holes (2b) in the studs (2a) of the second plate (1b), already positioned, passing through and threading the screw (10) into the additional hole (9), and fitting a drill bit (7) into the chimney (3) and drilling to the required diameter.

4. A method comprising:

providing the drill-and-hole detector tool according to claim 1; and operating the drill-and-hole detector tool to interchange an actuator fitting of a ramp for a main landing gear of an aircraft.

5. A method comprising:

providing the drill-and-hole detector tool according to claim 1; and operating the drill-and-hole detector tool to perform an in situ repair of a fuselage of an aircraft.

* * * * *